United States Patent [19]
Sakamoto et al.

[11] Patent Number: 5,473,960
[45] Date of Patent: Dec. 12, 1995

[54] STEERING RACK SHAFT AND METHOD OF MANUFACTURING THE SAME

[75] Inventors: Hideji Sakamoto; Masayoshi Ozawa; Seiji Kanuki; Kenji Hoshino; Toshiaki Tanaka, all of Kiryu, Japan

[73] Assignee: Kabushiki Kaisha Yamada Seisakusho, Gunma, Japan

[21] Appl. No.: 208,330

[22] Filed: Mar. 10, 1994

[30] Foreign Application Priority Data

Mar. 14, 1993 [JP] Japan ..................... 5-079102
Mar. 14, 1993 [JP] Japan ..................... 5-079103

[51] Int. Cl.⁶ .................... F16H 19/04; F16H 55/26; H05B 6/14
[52] U.S. Cl. .................... 74/422; 74/498; 148/572; 148/573; 219/640; 266/125; 266/129
[58] Field of Search ............... 74/89.17, 422, 74/498; 266/125, 129; 219/640; 148/572, 573

[56] References Cited

U.S. PATENT DOCUMENTS 3,814,202 6/1974 Rushton et al. .............. 74/498 X
4,133,221 1/1979 Clary .......................... 74/498
4,855,556 8/1989 Mucha et al. ................. 266/129
5,069,080 12/1991 Simon ........................ 74/498 X
5,242,514 9/1993 Wiener et al. ................ 74/498 X

FOREIGN PATENT DOCUMENTS 55-141525 11/1980 Japan ......................... 266/125

Primary Examiner—Allan D. Herrmann
Attorney, Agent, or Firm—Lowe, Price, LeBlanc & Becker

[57] ABSTRACT

A steering rack shaft having a shaft body and rack teeth formed in a predetermined axial region of the shaft body. This steering rack shaft is formed such that a workpiece is quenched, and is then heated for a predetermined time at a temperature exceeding 400° C. so as to be thermally refined, and the rack teeth are subsequently formed. After the formation of the rack teeth, high-frequency induction hardening is provided to form a teeth-hardened layer. Hence, the machining of the rack teeth is facilitated while reducing strain, and the rigidity and toughness of the overall steering rack shaft are improved.

11 Claims, 24 Drawing Sheets

NOT ROTATED

ROTATED

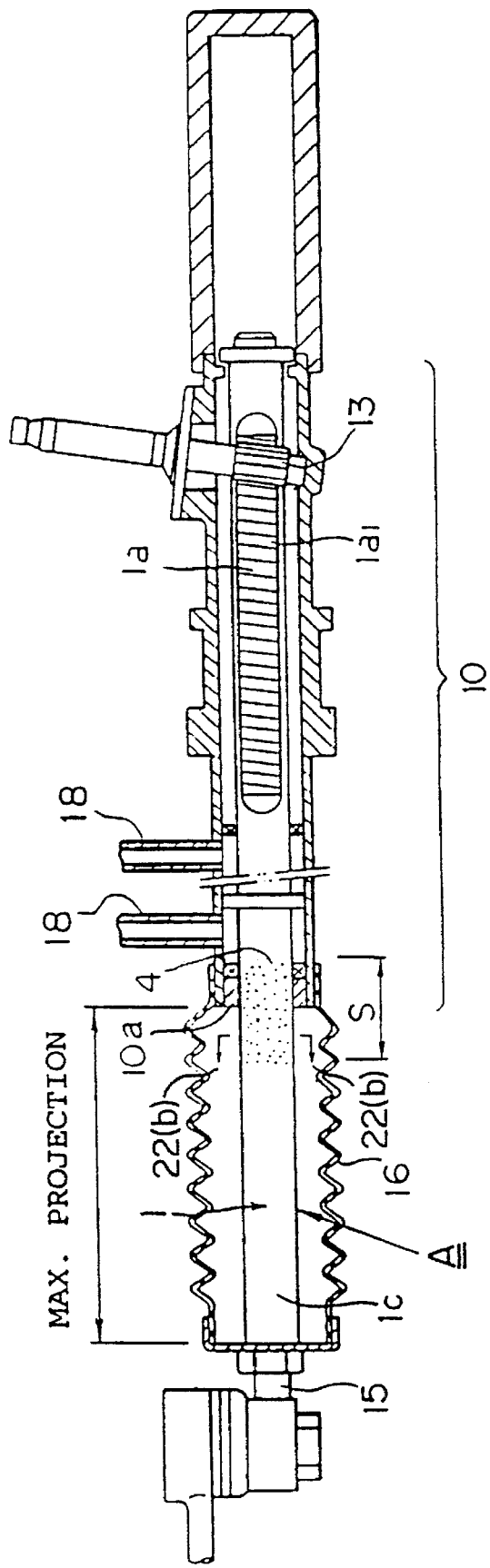
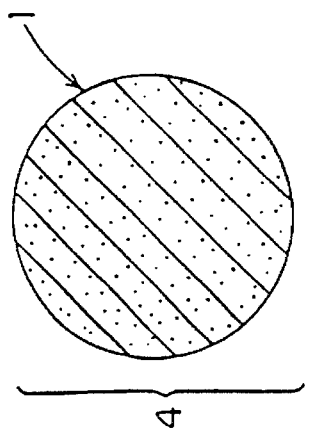

STEERING RACK SHAFT AND METHOD OF MANUFACTURING THE SAME

BACKGROUND OF THE INVENTION

1. Field of the Invention

The present invention relates to a steering rack shaft in which strain is reduced by partial thermal refining, and which facilitates the machining of rack teeth and the like, improves the manufacturing efficiency, lowers the manufacturing cost, and has enhanced rigidity, toughness, and strength, and to a method of manufacturing the same.

2. Description of the Related Art

A generally known steering rack shaft is thermally refined after a workpiece prior to the formation of rack teeth is quenched, the rack teeth are formed after the thermal refining, and the portion where the rack teeth have been formed is requenched, thereby imparting wear resistance characteristics to the steering rack shaft. The conventional thermal refining is considered to be performed over the entire body of the workpiece, i.e., over the region of its entire length.

Thermal refining referred to herein is an operation by which a workpiece, after being quenched, is tempered to a relatively high temperature (approx. 400° C. or more) so as to be converted to a troostite structure or a sorbite structure. The quenching treatment in this thermal refining is aimed at hardening or strengthening the workpiece up to its central portion uniformly, and after quenching, high-temperature tempering to an appropriate temperature of approximately 400° C. or more is usually conducted.

However, in a case where whole thermal refining is performed as in the case of a conventional steering rack shaft, there has been a drawback in that the strain (deflection) of the shaft due to that thermal refining becomes large in the form of a bow, as shown by the dotted line representing the conventional case in the graph of comparison of strain lines of heat treatment in FIG. 23. For this reason, much time is required for the strain-relieving operation, so that there has been a drawback in that the manufacturing efficiency declines, thereby resulting in higher manufacturing cost. Furthermore, even if the strain caused by the whole thermal refining is corrected, there has been a drawback in that a large strain occurs each time heat treatment is subsequently provided (for a rack teeth portion, a shaft portion, and the like) due to the residual stress in the workpiece (the steel product of the steering rack shaft).

In addition, it has been necessary to set the hardness in thermal refining to a relatively low level so as to improve the machining efficiency and the life of the machine tool by ameliorating the machinability of the rack teeth at the rack teeth-forming portion and the like. For this reason, it has been difficult to improve the strength and toughness of the steering rack shaft and to enhance the rigidity thereof. That is, if the hardness of the inner portion is reduced to ameliorate the machinability as shown in FIG. 24 (the relationship between the hardness of the inner portion of the shaft and bending load), the resistance against a bending load becomes weak. On the other hand, if the resistance against the bending load is strengthened, and the harder the workpiece (steering rack shaft) is thereby made, the more the following disadvantages appear such as the acceleration of damage to the tool, the deterioration of machining accuracy, increased cutting resistance, increased cutting temperature, and the promotion of progress of wear.

Furthermore, the whole thermal refining in a furnace is a method which employs a facility in which an in-furnace temperature is set to a high level, and heat treatment is provided with respect to a multiplicity of workpieces in one lot. This method is quite different from a material handling process in which workpieces can be processed or handled one at a time as in other machining or high-frequency induction hardening. Hence, the preparation and machining of the workpieces in this method need to be effected at a number of places and require special management of the workpieces therefor. For this reason, in thermal refining treatment, much labor is required including the operation of placing a multiplicity of workpieces within the furnace. As a result, there have been drawbacks in that the number of manufacturing processes increases, that the material handling becomes complicated, and that it is difficult to adopt an integrated manufacturing line, leading to a decline in the manufacturing efficiency and an increase in the manufacturing cost. In addition, if the whole thermal refining of a multiplicity of workpieces is used, it is impossible to circumvent the possibility of occurrence of a multiplicity of defects in quality at one time.

SUMMARY OF THE INVENTION

Accordingly, a primary object of the present invention is to provide a steering rack shaft which has high strength and high toughness.

To this end, in accordance with one aspect of the present invention, there is provided a steering rack shaft comprising: a shaft body; and a rack-teeth forming portion provided over a fixed axial region of the shaft body, wherein at least an axial partial portion of the rack-teeth forming portion is provided with thermal refining treatment.

A second object of the present invention is to provide a method of manufacturing a steering rack shaft which makes it possible to improve the manufacturing efficiency, reduce the manufacturing cost, and satisfactorily perform machining including cutting and the like.

To this end, in accordance with another aspect of the present invention, there is provided a method of manufacturing a steering rack shaft, comprising the steps of: heat treating by way of thermal refining at least an axial partial portion of a rack-teeth forming portion of a shaft body; forming rack teeth in the rack-teeth forming portion; and high-frequency induction hardening the rack teeth to form a teeth-hardened layer.

The above and other objects, features and advantages of the present invention will become more apparent from the following detailed description of the invention when read in conjunction with the accompanying drawings.

BRIEF DESCRIPTION OF THE DRAWINGS

FIG. 3(*b*) is an enlarged cross-sectional view taken in the direction of arrows along line 3(*b*) in FIG. 3(*a*);

FIG. 3(*c*) is an enlarged cross-sectional view taken in the direction of arrows along line 3(*b*) in FIG. 3(*a*), and illustrates rack teeth subjected to high-frequency induction hardening;

FIG. 22 (a) is a cross-sectional view of an essential portion of a power steering apparatus in another example in which the steering rack shaft in accordance with the present invention is provided;

FIG. 22(b) is an enlarged cross-sectional view taken in the direction of arrows along line 22(b) in FIG. 22 (a)

DESCRIPTION OF THE PREFERRED EMBODIMENTS

Referring now to the accompanying drawings, a description will be given of an embodiment of the present invention.

Figure 1:
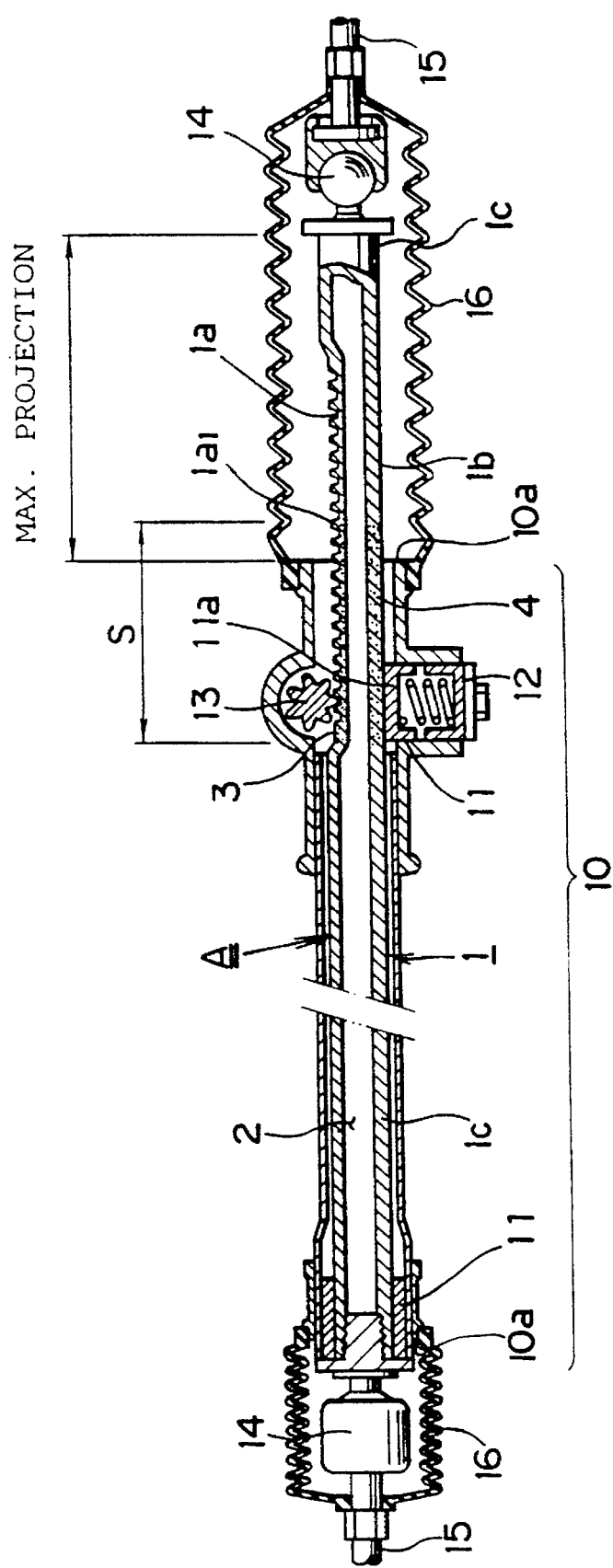
FIG. 1 is a cross-sectional view of an essential portion of a normal steering apparatus to which the present invention is applied.
Figure 2:
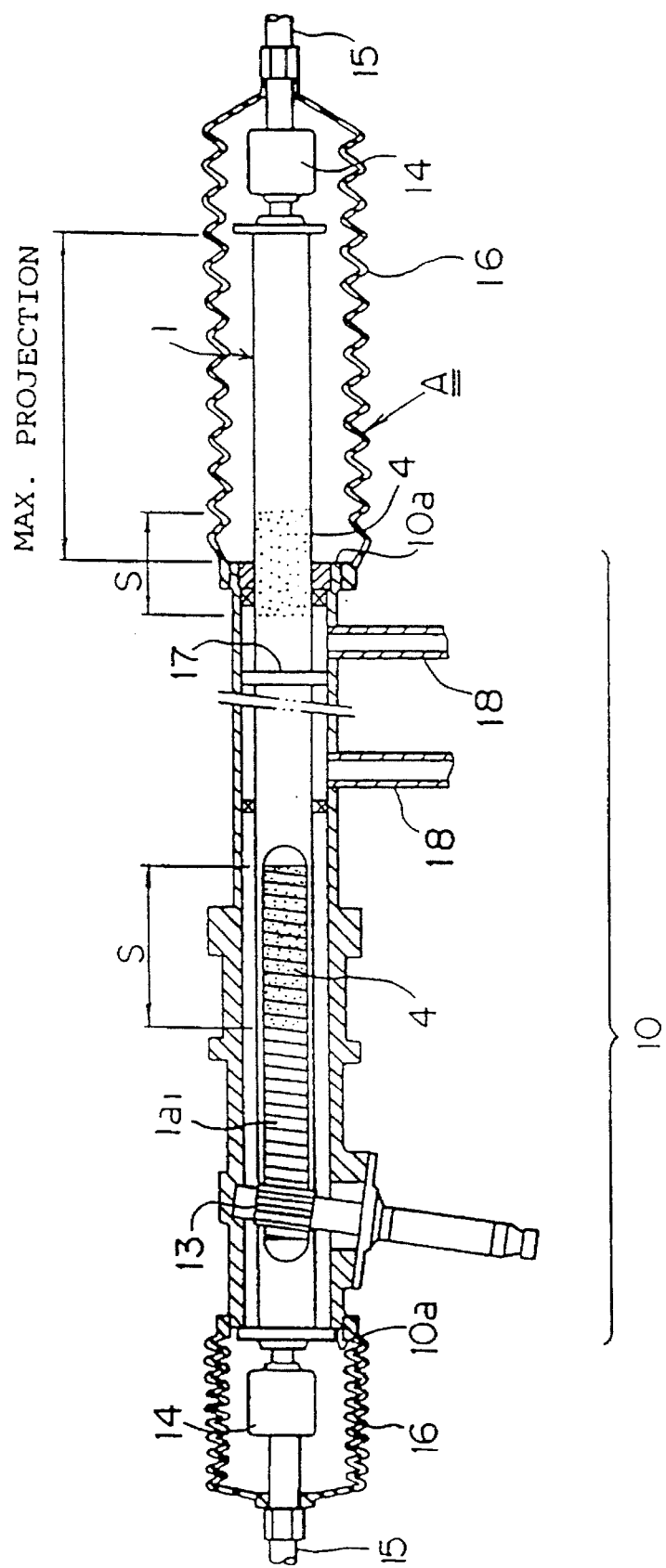
FIG. 2 is a cross-sectional view of an essential portion of a power steering apparatus to which the present invention is applied.

FIGS. 1 and 2 show overall steering rack shafts A in accordance with the present invention. A through hole 2 is formed, as necessary, in a shaft body 1 of the steering rack shaft A along a central axis of the shaft body 1. Accordingly, there are cases where the steering rack shaft A has a substantially round, solid cross section, and where the steering rack shaft A has a substantially round, hollow cross section.

A flat portion 3, through not necessarily required, is formed at an appropriate portion close to one end of the shaft body 1 on the right-hand side in the drawing, by means of cutting processing or plastic processing, such as drawing or press working. Both ends of the shaft body 1 are formed as a shaft portion 1c having a long length, and a shaft portion 1c having a short length, and a rack-teeth forming portion 1a having the flat portion 3 as well as a rear-surface portion 1b are formed. A plurality of rack teeth $1_{a1}$ are formed at the rack-teeth forming portion 1a. The rear-surface portion 1b refers to a semicircular portion on the diagonally opposite side of the rack-teeth forming portion 1a, and the axial length of this rear-surface portion 1b is equal to the length over which the flat portion 3 is formed.

Heat treatment is provided in such a manner that at least an axial partial portion of the rack-teeth forming portion 1a is thermally refined, and the hardness of that portion 1a and the hardness of the rear-surface portion 1b diametrically opposite thereto become different. It should be noted that, in the appended drawings, a portion which is subjected to thermal refining will be indicated by reference numeral 4.

Figure 3A:
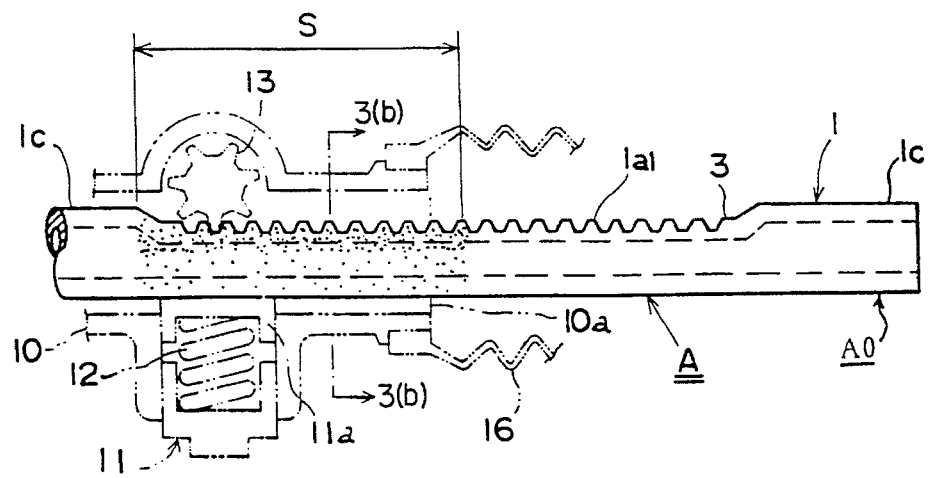
FIG. 3(*a*) is a side elevational view of the essential portion in accordance with the present invention.
Figure 3B:
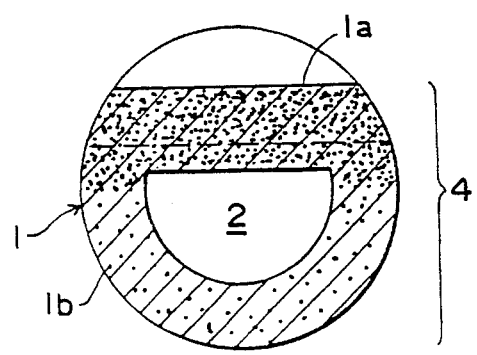
Figure 3C:
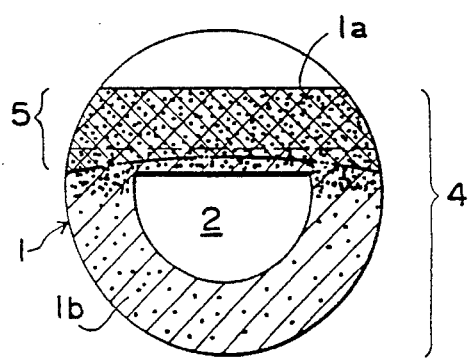
Figure 4A:
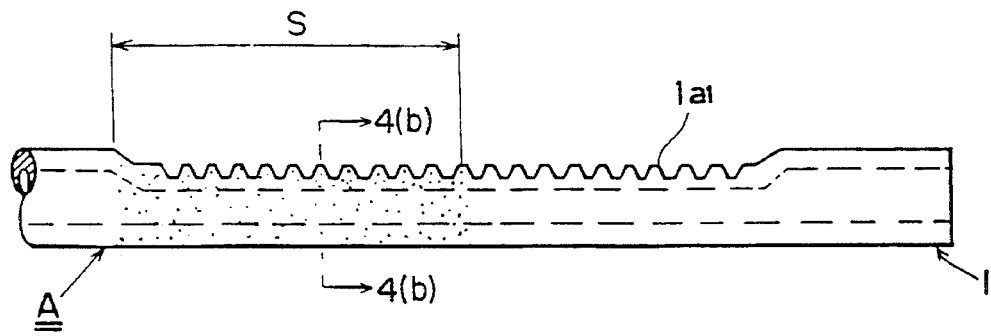
FIG. 4(a) is a side elevational view of an essential portion of another example in accordance with the present invention.
Figure 4B:
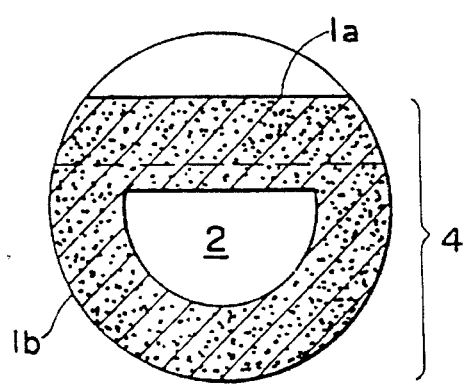
FIG. 4(b) is an enlarged cross-sectional view taken in the direction of arrows along line 4(b) in FIG. 4(a)
Figure 4C:
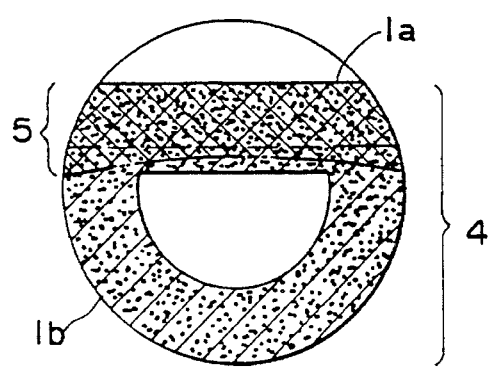
FIG. 4(c) is an enlarged cross-sectional view taken in the direction of arrows along line 4(b) in FIG. 4(a), and illustrates rack teeth subjected to high-frequency induction hardening.

The range or the area of thermal refining refers to a corresponding portion from a right-hand end 10a of a gear box 10 to the left-hand side of a rack-supporting portion 11 when the right-hand side of the steering rack shaft A is projected by a maximum degree in the rightward direction, as shown in FIG. 3(a). In the appended drawings, the range of that corresponding portion is indicated at S. In FIG. 4(a) as well, the range S of the portion of thermal refining is the same as in FIG. 3(a). Also, there are cases where the range or the area of thermal refining refers to a corresponding portion from the end 10a of the gear box to a rack-resiliently-supporting device 12, in which case this is substantially the same as in FIG. 3(a).

Figure 5A:
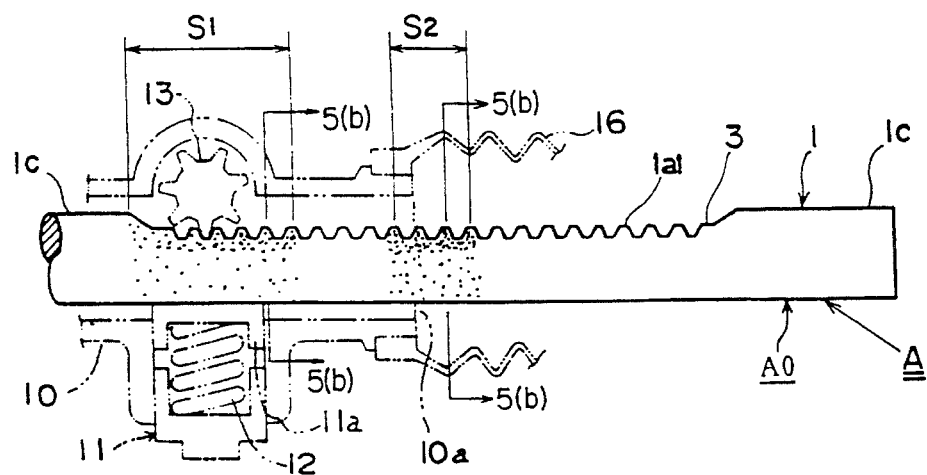
FIG. 5(a) is a side elevational view of an essential portion of still another example in accordance with the present invention.
Figure 5B:
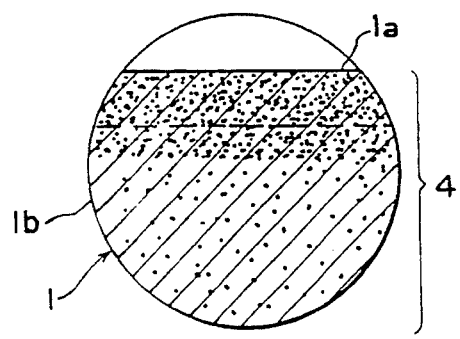
FIG. 5(b) is an enlarged cross-sectional view taken in the direction of arrows along line 5(b) in FIG. 5 (a)
Figure 5C:
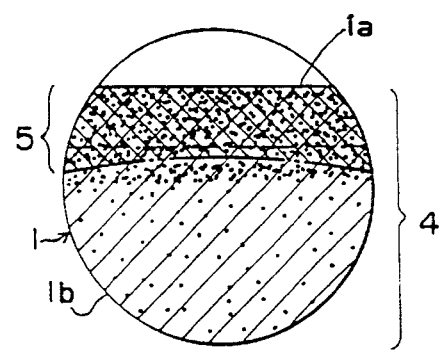
FIG. 5(c) is an enlarged cross-sectional view taken in the direction of arrows along line 5(b) in FIG. 5(a), and illustrates rack teeth subjected to high-frequency induction hardening.
Figure 6A:
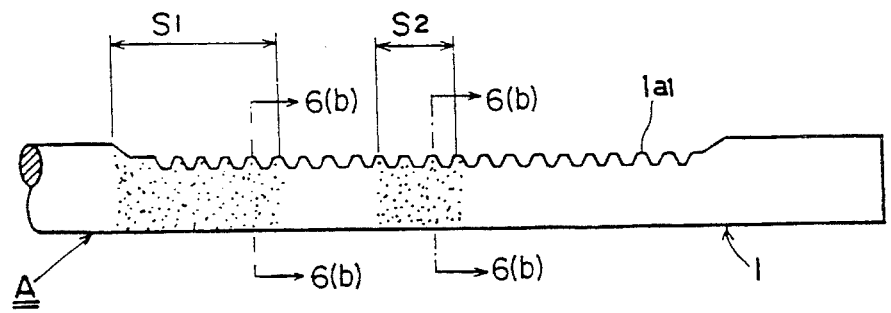
FIG. 6(a) is a side elevational view of an essential portion of a further example in accordance with the present invention.
Figure 6B:
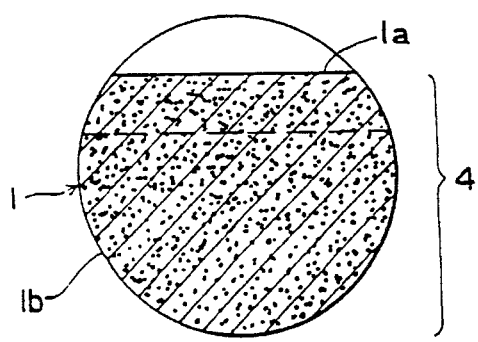
FIG. 6(b) is an enlarged cross-sectional view taken in the direction of arrows along line 6(b) in FIG. 6(a)
Figure 6C:
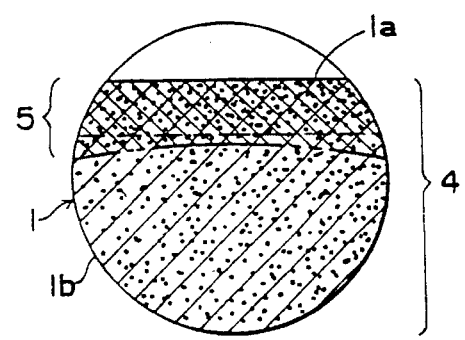
FIG. 6(c) is an enlarged cross-sectional view taken in the direction of arrows along line 6(b) in FIG. 6(a), and illustrates rack teeth subjected to high-frequency induction hardening.

In addition, as shown in FIG. 5(a), there are cases where the range or the area of thermal refining refers to respective corresponding portions at the right-hand end 10a of the gear box 10 and at the rack-supporting portion 11. There are two corresponding portions in this case, and are denoted in the drawing as ranges S1 and S2. In FIG. 6(a) as well, the partial ranges S1 and S2 of thermal refining are the same as in FIG. 5(a).

Figure 7A:
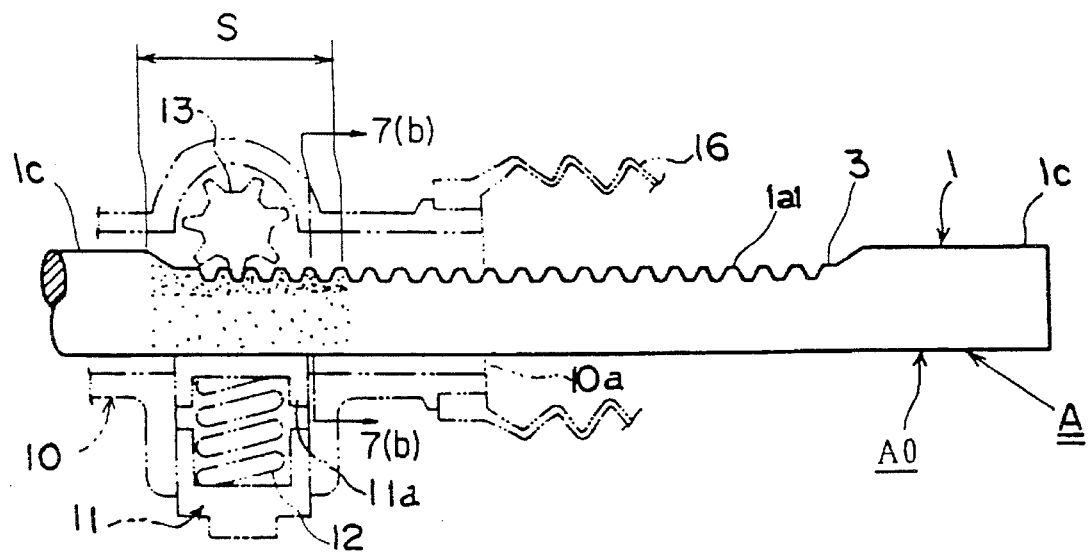
FIG. 7(a) is a side elevational view of an essential portion of a further example in accordance with the present invention.
Figure 7B:
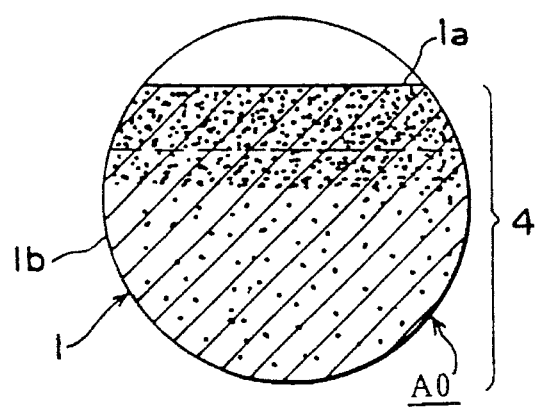
FIG. 7(b) an enlarged cross-sectional view taken in the direction of arrows along line 7(b) in FIG. 7 (a)
Figure 8A:
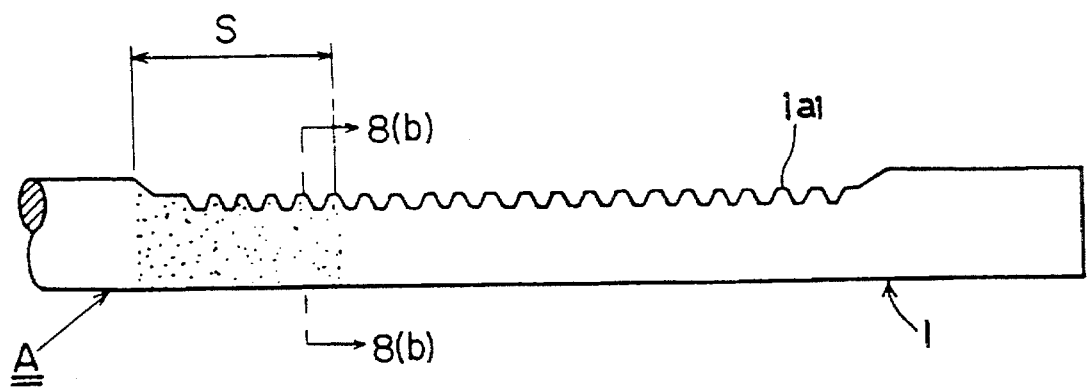
FIG. 8(a) is a side elevational view of an essential portion of a further example in accordance with the present invention.
Figure 8B:
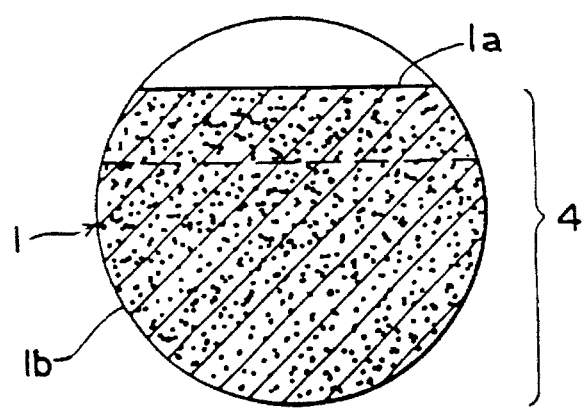
FIG. 8(b) is an enlarged cross-sectional view taken in the direction of arrows along line 8(b) in FIG. 8(a)

In addition, FIGS. 7(a) and 8(a) show an example in which thermal refining is performed by setting as a corresponding portion a supported portion located in the vicinity of a rack-supporting member (rack guide) 11a, and the range of that corresponding portion is indicated at S.

Figure 9A:
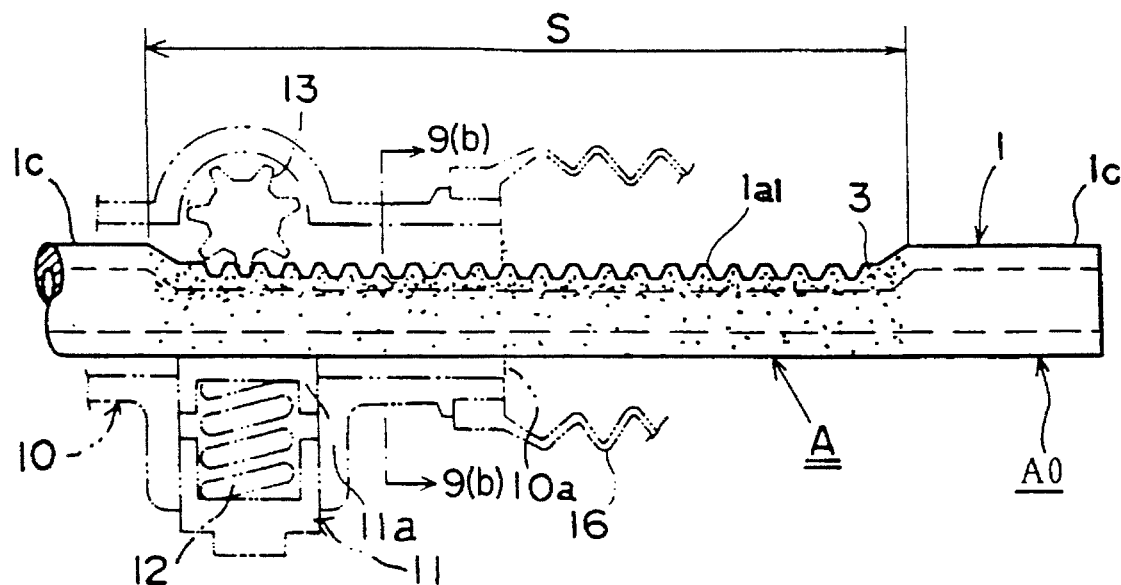
FIG. 9(a) is a side elevational view of an essential portion of a further example in accordance with the present invention.
Figure 9B:
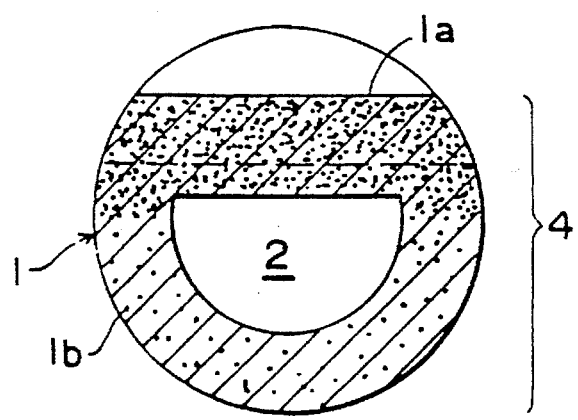
FIG. 9(b) is an enlarged cross-sectional view taken in the direction of arrows along line 9(b) in FIG. 9(a)
Figure 10A:
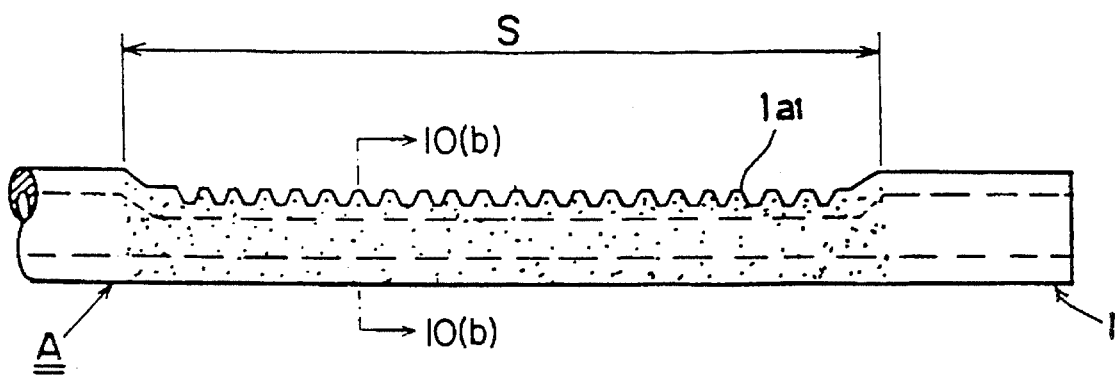
FIG. 10(a) is a side elevational view of an essential portion of a further example in accordance with the present invention.

In addition, FIGS. 9(a) and 10(a) show an example in which thermal refining is performed over the entire portion of the rack-teeth forming portion 1a (a part of the longitudinal length of the rack shaft). The range in this case is also indicated at S.

It should be noted that, in FIGS. 1 and 2, reference numeral 13 denotes a pinion; 14, a coupling; 15, a tie-rod; 16, a bellows; 17, a piston; and 18, a port.

Next, a specific description will be given of an example of a method of manufacturing a steering rack shaft in accordance with the present invention.

Figure 15A:
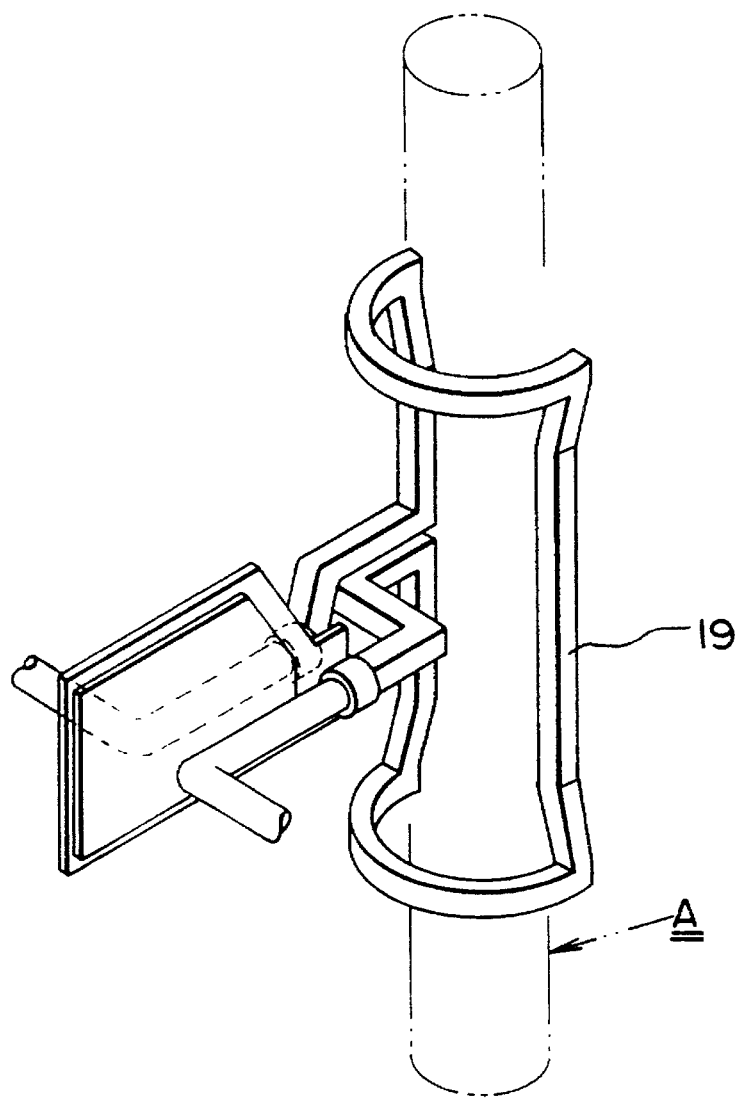
FIG. 15(a) is a perspective view of an induction coil for quenching.
Figure 15B:
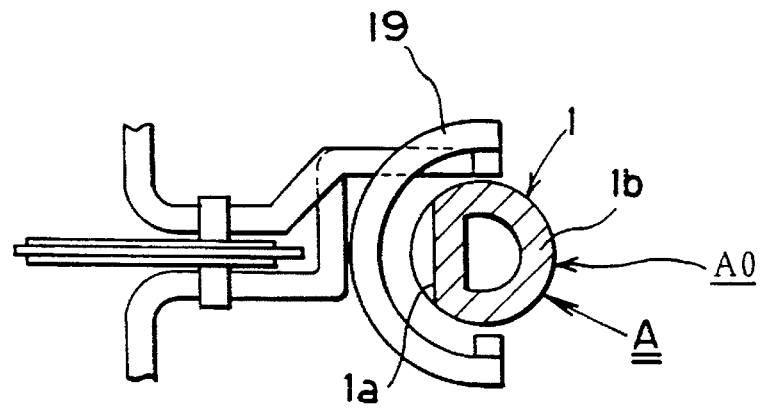
FIG. 15(b) is a diagram illustrating a state in which quenching treatment is being performed by means of the induction coil for quenching.
Figure 19A:
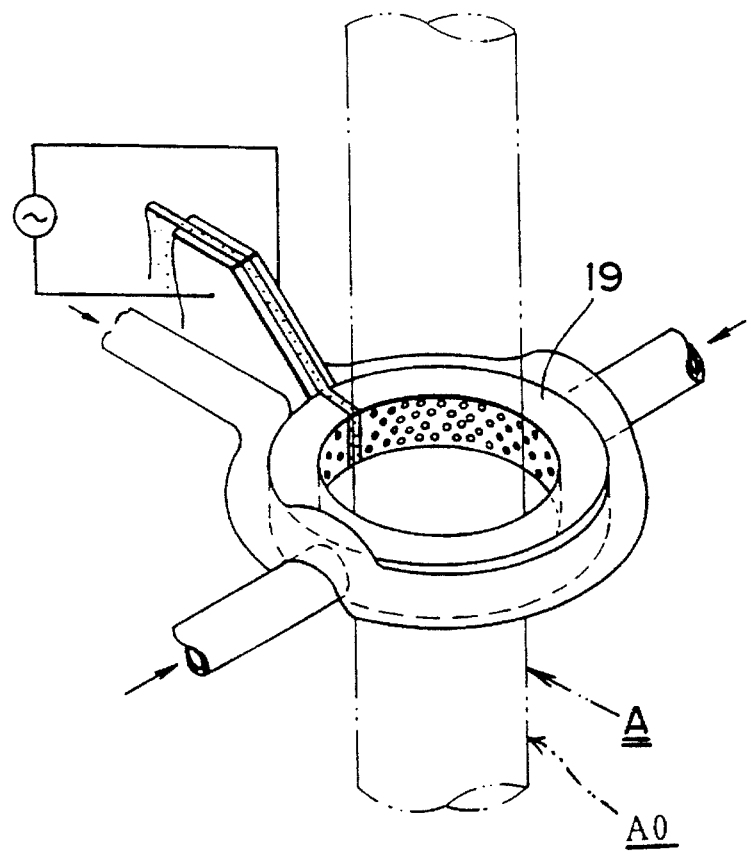
FIG. 19(a) is a perspective view of another example of the induction coil for quenching for performing quenching treatment.
Figure 19B:
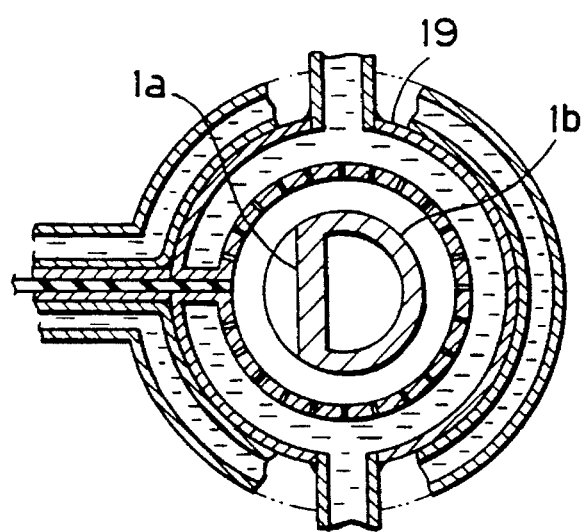
FIG. 19(b) is a cross-sectional view in which quenching treatment is being performed by means of the induction coil for quenching shown in FIG. 19(a)

First, a hollow steering rack workpiece $A_0$ (having an outside diameter of about 25 mm, an overall length of about 800 mm, and a through hole diameter of about 10 mm) whose material is made of S45C (JIS) is subjected to quenching for several seconds to several dozens of seconds at a quenching temperature of about 800° C. to 900° C. by means of a quenching induction coil 19 (e.g., a frequency of 200 kHz, an anode voltage of 7 kV, an anode current of 6 A, a workpiece $A_0$ rotating speed of 220 rpm) of a high-frequency induction hardening apparatus shown in FIG. 15. The metallographic structure is thereby converted into a martensitic structure. At this time, in a case where the induction coil 19 shown in FIGS. 19(a) 19(b), it is necessary to vertically move the workpiece $A_0$ or the induction coil 19.

Cooling water is allowed to flow through such an induction coil 19 from an end of the pipe so as to prevent the coil from being fused due to its own heat generation. After such heating, the outer side of the workpiece $A_0$ and, if the through hole 2 is provided, the inner side thereof are cooled simultaneously. Specifically, cooling water (an aqueous solution containing 10% of an ethylene glycol-based quench-crack preventing agent) is applied to the outer side of the workpiece $A_0$ in the form of a shower (in this case, from three directions) by means of a water jacket, and the cooling water is circulated through the inner side. In the case of the solid workpiece $A_0$ which is not provided with the through hole 2, only the outer side is cooled. The quenching is completed by a series of these operations.

Figure 16:
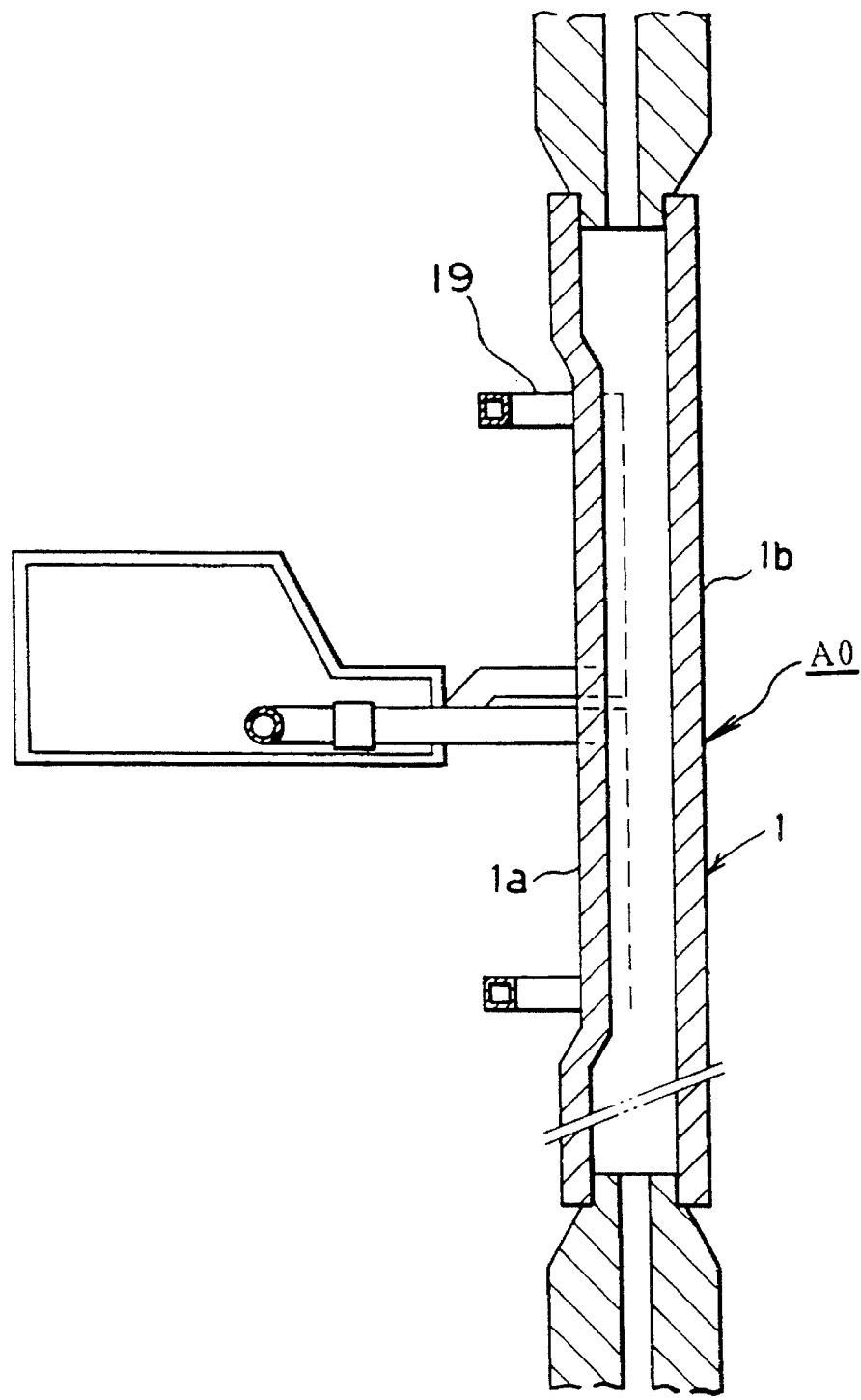
FIG. 16 is a cross-sectional view in which heat treatment for quenching is being performed by the induction coil for quenching.

Subsequently, as shown in FIGS. 16 and 17, an induction coil 20 for high-frequency thermal refining is located in position, and the rack-teeth forming portion (a portion to be processed) is subjected to tempering at a tempering temperature of about 500° C. to 700° C. by setting the heating time to several seconds to several dozens of seconds. This completes the thermal refining, thereby converting the metallographic structure to a thermally refined structure (troostite or sorbite structure).

Figure 17A:
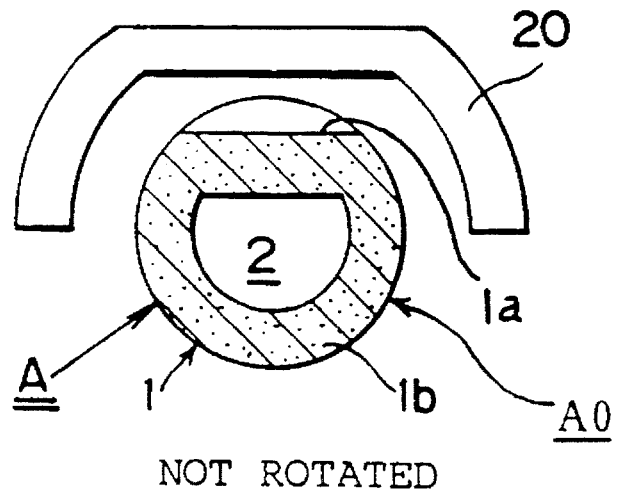
FIG. 17(a) is a schematic diagram of thermal refining treatment in a state in which a workpiece is not rotated.
Figure 18A:
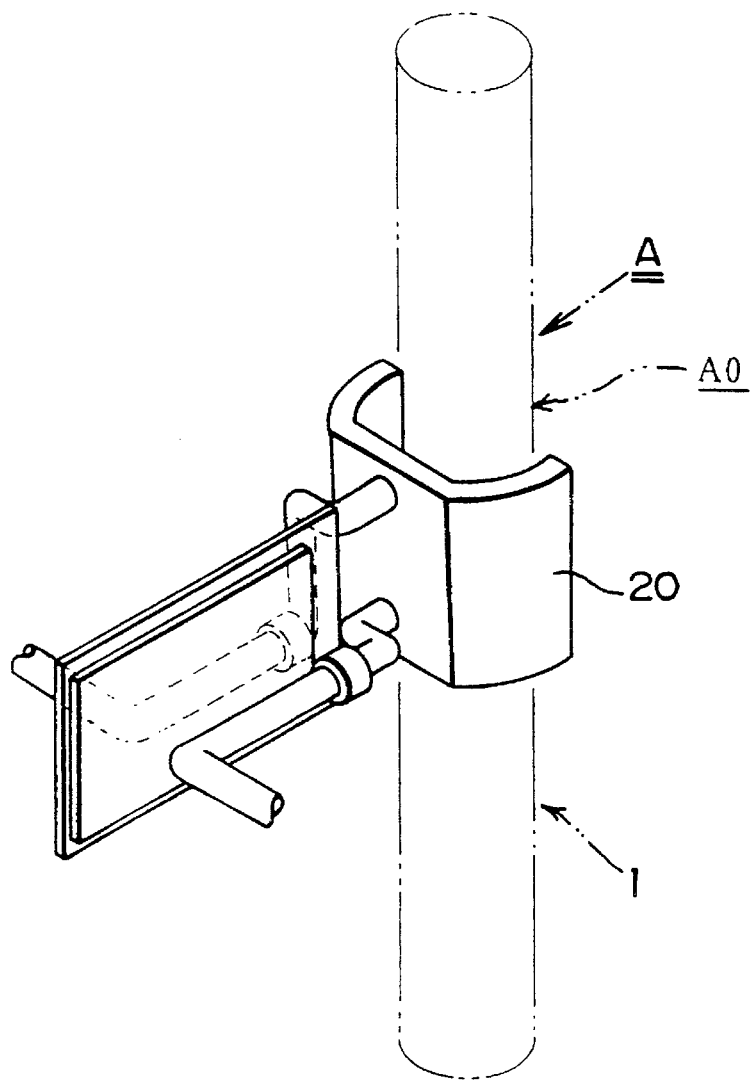
FIG. 18(a) is a perspective view of an induction coil for thermal refining.
Figure 18B:
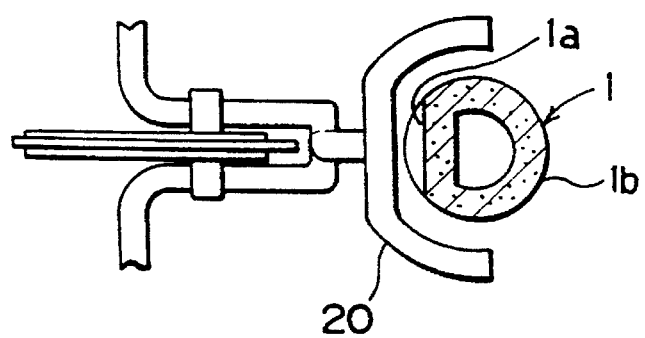
FIG. 18(b) is a diagram illustrating a state in which thermal refining treatment is being performed by means of the induction coil for thermal refining.

The thermal refining, which is performed such that the hardness of the rack-teeth forming portion 1a and the hardness of the rear-surface portion 1b diametrically opposite thereto differ, is conducted as follows: Namely, in the case of the tempering process, as shown in FIGS. 17(a), 18(a), and 18(b), the steering rack workpiece $A_0$ is set in a fixed state, and only its rack-teeth forming portion 1a side is heated for a predetermined time by the induction coil 20 for thermal refining for heating only the semicircular cross section of the steering rack workpiece $A_0$. Consequently, the tempering temperature of the rear-surface portion 1b side becomes lower than that of the rack-teeth forming portion 1a side owing to the tempering action due to its thermal effect. Hence, the hardness of the two portions is made different. This is because, in thermal refining, the tempering treatment is generally carried out at a high temperature above 400° C., and the higher the tempering temperature, the lower the hardness becomes.

Cross sections in which the hardness differs at the rack-teeth forming portion 1a (the hardness is low) and at the rear-surface portion 1b (the hardness is high) are shown in FIGS. 3, 5, 7, and 9. In each of these cases, the structure of the teeth-surface side has a higher density than the rear-surface side, and if the density is high, the hardness becomes low. The parts (b) of FIGS. 3, 5, 7, and 9 show cross sections in the state in which thermal refining is provided. FIGS. 3(c) and 5(c) show cross sections in which the rack teeth $1_{a1}$ are finally subjected to high-frequency induction hardening while maintaining the state shown in the parts (b) of the drawings, and are formed as a teeth-hardened layer 5.

Since the thermal refining is provided in the above-described manner such that the hardness of the rack-teeth forming portion 1a and the hardness of the rear-surface portion 1b diametrically opposite thereto differ, the rear-surface portion is capable of maintaining strength during use, while the machinability is made remarkably satisfactory when the rack teeth $1_{a1}$ are formed in the rack-teeth forming portion 1a.

In the above-described thermal refining, when the thermally refined hardness of the rack-teeth forming portion 1a was set to, for instance, about 15 to 28 in HRC, it was possible to increase the thermally refined hardness of the rear-surface portion 1b to about 30 to 50 in HRC. In this case, under the conditions where a portion of the rack-teeth forming portion 1a was provided with partial thermal refining to set the thermally refined hardness to HRC 23 on the teeth side and to HRC 35 on the rear-surface side, while the conventional steering rack shaft was provided with whole thermal refining to set the thermally refined hardness to HRC 21, and when the entire steering rack shaft A was set in a fixed state, and one end thereof on the side provided with the rack teeth was pressed and bent, the bending load increased by about 50% in the case of the partial thermal refining than in the conventional whole thermal refining.

Figure 17B:
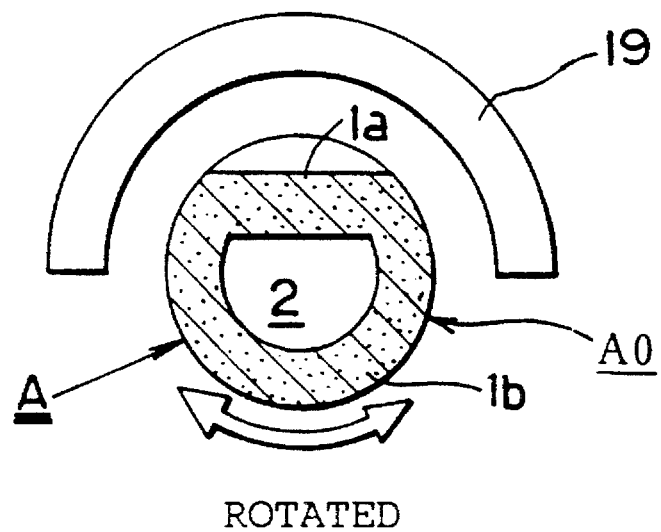
FIG. 17(b) is a schematic diagram of thermal refining treatment in a state in which a workpiece is rotated.

As another embodiment of the steering rack shaft A, an axial partial portion of the rack-teeth forming portion 1a is thermally refined. The tempering temperature of thermal refining is set to 400° C. or more for both the rack-teeth forming portion 1a and the rear-surface portion 1b, and this heat treatment is provided in the vicinity (400° C. to approx. 500° C.) of this temperature. In addition, both the hardness and the machinability are satisfied. The hardness of the rack-teeth forming portion 1a and the rear-surface portion 1b in this case are the same. To obtain the same hardness, as shown in FIG. 17(b), the steering rack workpiece $A_0$ is set in a rotated state, and the overall shaft is heated by the induction coil 20 for heating only the semicircular cross section of the steering rack workpiece $A_0$, thereby providing the thermal refining treatment.

In the embodiment, cross sections in which the hardness is the same at the rack-teeth forming portion 1a and at the rear-surface portion 1b are shown in FIGS. 4, 6, 8, 10. In each of these cases, the density of the structure of the entire cross section is formed uniformly. The parts (b) of FIGS. 4, 6, 8, 10 show cross sections in the state in which thermal refining is provided. FIGS. 4(c) and 6(c) show cross sections in which the rack teeth 1a1 are finally subjected to high-frequency induction hardening while maintaining the state shown in the parts (b) of the drawings, and are formed as the teeth-hardened layer 5.

As still another embodiment of the steering rack shaft A, at least an axial partial portion of the rack-teeth forming portion 1a is quenched and tempered, and only the rack-teeth forming portion 1a is subjected to thermal refining, and the heat treatment is provided such that the hardness differs between at least the thermally refined portion of the rack-teeth forming portion 1a and the rear-surface portion 1b (only tempered) diametrically opposite thereto. In the case of the tempering process, in the same was as in the embodiment shown in FIGS. 3, 5, 7, and 9, the steering rack workpiece $A_0$ is set in a fixed state, and only its rack-teeth forming portion 1a side is heated for a predetermined time by the induction coil 20 for thermal refining for heating only the semicircular cross section of the steering rack workpiece $A_0$. If the tempering temperature of the rack-teeth forming portion 1a side at that time is set to 400° C. or more, and this heat treatment is provided in the vicinity (400° C. to approx. 500° C.) of this temperature, the rack-teeth forming portion 1a is thermally refined. On the other hand, if the rear-surface portion 1b side is tempered by setting the heating temperature to a level lower than 400° C., e.g., at a low temperature of 300° C., the structure of the rear-surface portion 1b remains a martensitic structure, and it is possible to stabilize the structure without appreciably lowering the hardness. As a result, the rear-surface portion 1b is merely provided with tempering treatment.

Figure 11A:
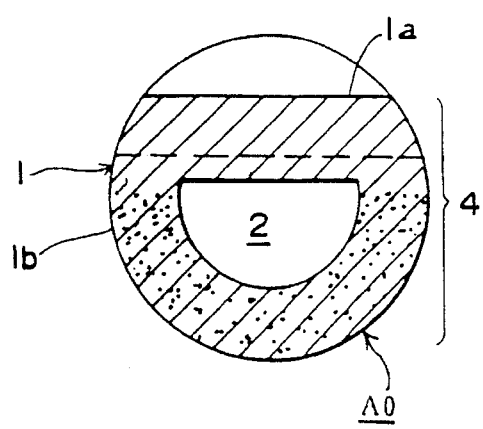
FIG. 11(a) is an enlarged cross-sectional view illustrating a modification of a hollow steering rack shaft.
Figure 11B:
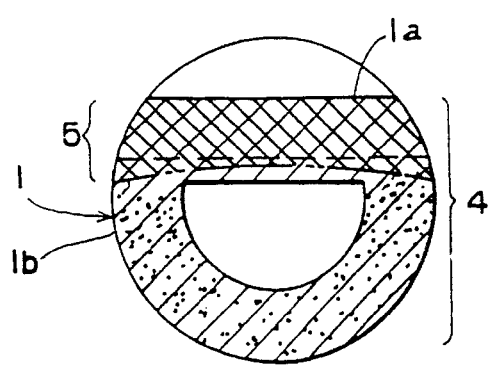
FIG. 11(b) is an enlarged cross-sectional view in which the rack teeth in FIG. 11(a) are subjected to high-frequency induction hardening.
Figure 11C:
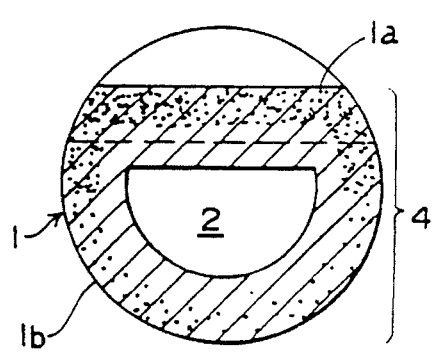
FIG. 11(c) is an enlarged cross-sectional view illustrating another modification of a hollow steering rack shaft.
Figure 11D:
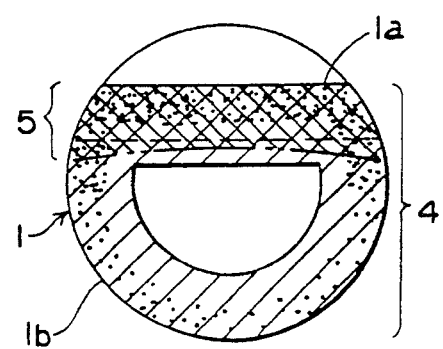
FIG. 11(d) is an enlarged cross-sectional view in which the rack teeth in FIG. 11(c) are subjected to high-frequency induction hardening.
Figure 11E:
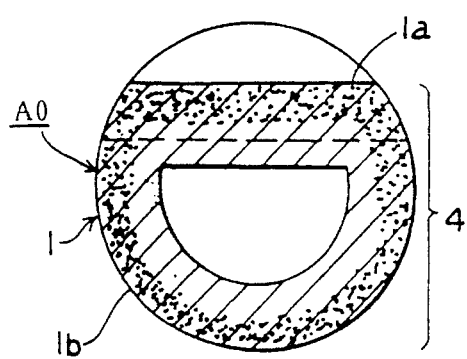
FIG. 11(e) is an enlarged cross-sectional view illustrating still another modification of a hollow steering rack shaft.
Figure 11F:
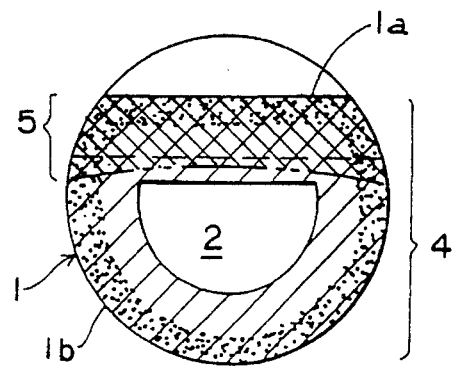
FIG. 11(f) is an enlarged cross-sectional view in which the rack teeth in FIG. 11(e) are subjected to high-frequency induction hardening.
Figure 12A:
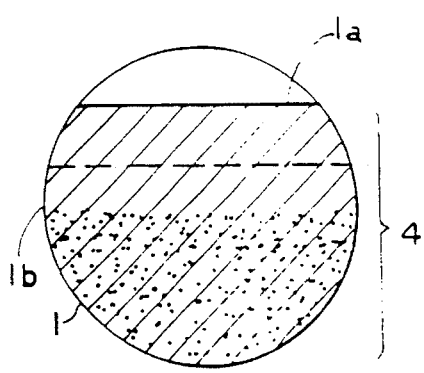
FIG. 12(a) is an enlarged cross-sectional view illustrating a modification of a solid steering rack shaft.
Figure 12B:
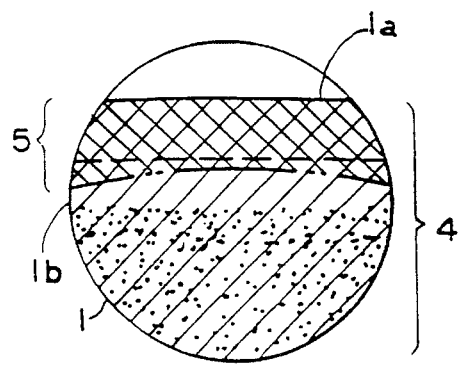
FIG. 12(b) is an enlarged cross-sectional view in which the rack teeth in FIG. 12(a) are subjected to high-frequency induction hardening.
Figure 12C:
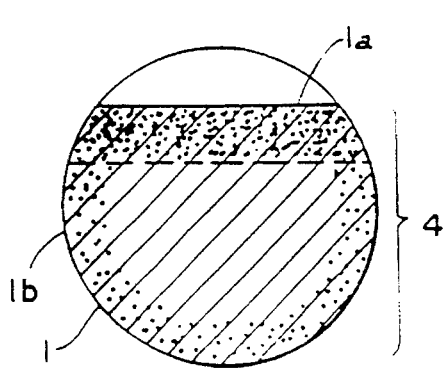
FIG. 12(c) is an enlarged cross-sectional view illustrating another modification of a solid steering rack shaft.
Figure 12D:
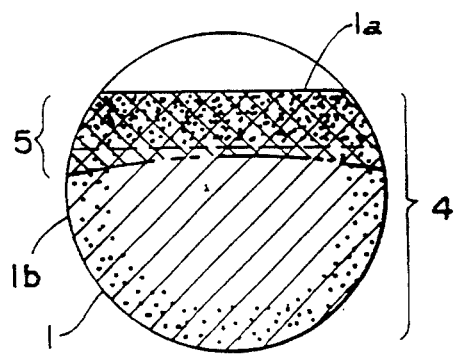
FIG. 12(d) is an enlarged cross-sectional view in which the rack teeth in FIG. 12(c) are subjected to high-frequency induction hardening.
Figure 12E:
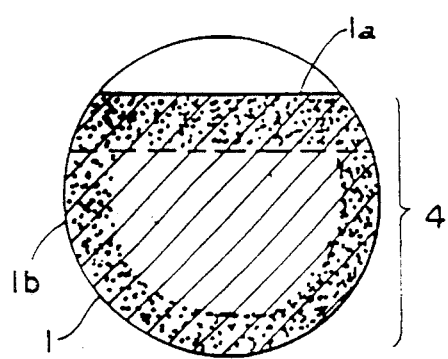
FIG. 12(e) is an enlarged cross-sectional view illustrating still another modification of a solid steering rack shaft.
Figure 12F:
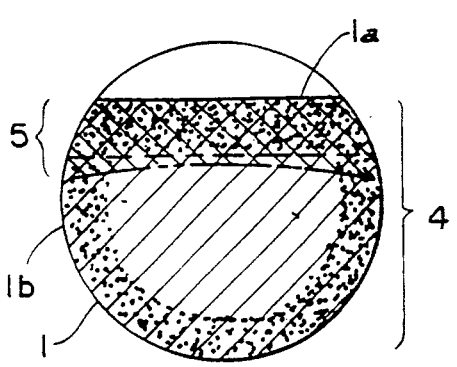
FIG. 12(f) is an enlarged cross-sectional view in which the rack teeth in FIG. 12(e) are subjected to high-frequency induction hardening.

In addition, FIGS. 11(a) to 11(f) show cross-sections of further embodiments of the hollow steering rack shaft A. In FIG. 11(a), the rack-teeth forming portion 1a is a non-refined portion (in a green state or the like), and the rear-surface portion 1b is thermally refined. FIG. 11(b) shows a cross section in which the rack teeth $1_{a1}$ are finally subjected to high- frequency induction hardening while maintaining its state shown in FIG. 11(a), and are formed as the teeth-hardened layer 5. In FIG. 11(c), the rack-teeth forming portion 1a and the rear-surface portion 1b as a whole, i.e., only the outer periphery in the cross section of the shaft body 1 is thermally refined, and is formed such that the hardness differs between the rack-teeth forming portion 1a (the hardness is low) and the rear-surface portion 1b (the hardness is high). Its central portion is a non-refined portion (in the green state or the like). FIG. 11(d) shows a cross section in which the rack-teeth forming portion $1_{a1}$ are finally subjected to high-frequency induction hardening while maintaining the state shown in FIG. 11(c), and are formed as the teeth-hardened layer 5. In addition, in FIG. 11(e), the rack-teeth forming portion 1a and the rear-surface portion 1b as a whole, i.e., only the outer periphery in the cross section of the shaft body 1 is thermally refined, and is formed such that the hardness of the rack-teeth forming portion 1a and that of the rear-surface portion 1b are the same. Its central portion is a non-refined portion (in the green state or the like). FIG. 11(f) shows a cross section in which the rack-teeth forming portion $1_{a1}$ are finally subjected to high-frequency induction hardening while maintaining the state shown in FIG. 11(e), and are formed as the teeth-hardened layer 5.

In addition, FIGS. 12(a) to 12(f) show cross-sections of still further embodiments of the solid steering rack shaft A, and their specific forms are the same as those shown in FIGS. 11(a) to 11(f).

Figure 20A:
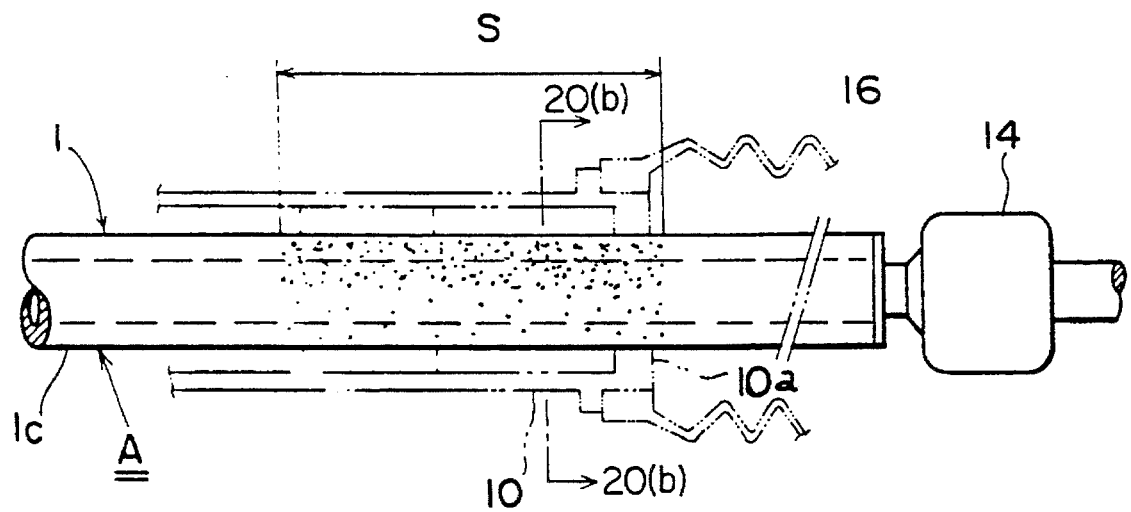
FIG. 20(a) is a side elevational view of an essential portion of a hollow steering rack shaft.
Figure 20B:
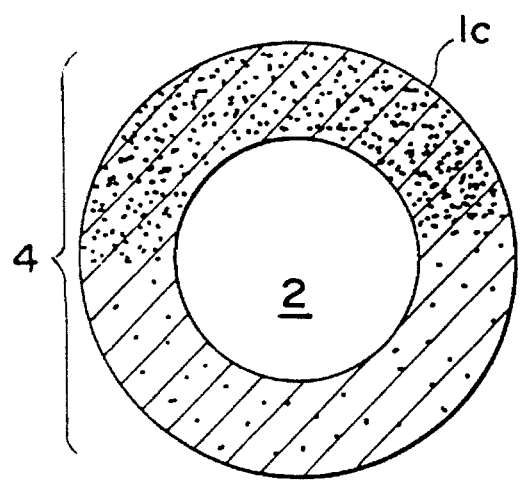
FIG. 20(b) is an enlarged cross-sectional view taken in the direction of arrows along line 20(b) in FIG. 20(a)
Figure 21A:
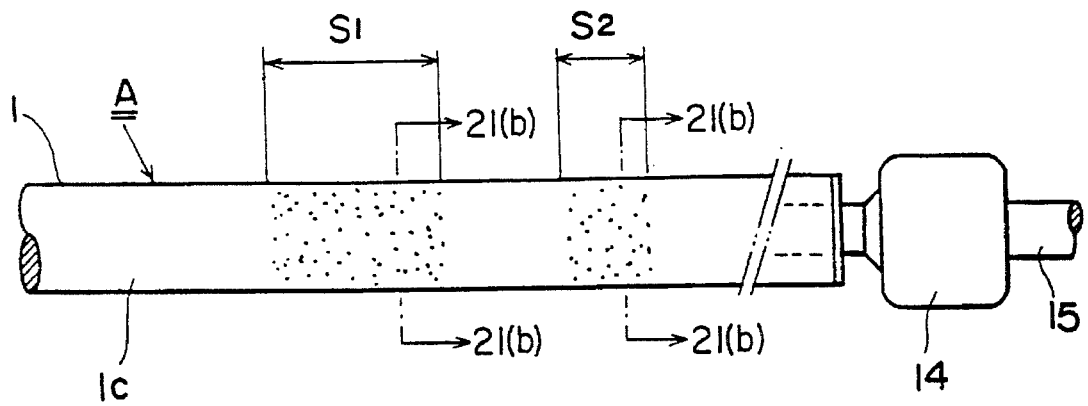
FIG. 21(a) is a side elevational view of an essential portion of a solid steering rack shaft.

As shown in FIGS. 20 and 22, there are cases where partial thermal refining is provided at appropriate portions of the shaft portion 1c of the shaft body 1. Namely, the partial thermal refining is performed with respect to a corresponding portion at the end 10a of the gear box 10 when the steering rack shaft A is projected by a maximum degree from the gear box 10, the range of that corresponding portion being indicated at S. In FIG. 21(a), the range of thermal refining in FIG. 20 is divided into two ranges S1 and S2.

Figure 10B:
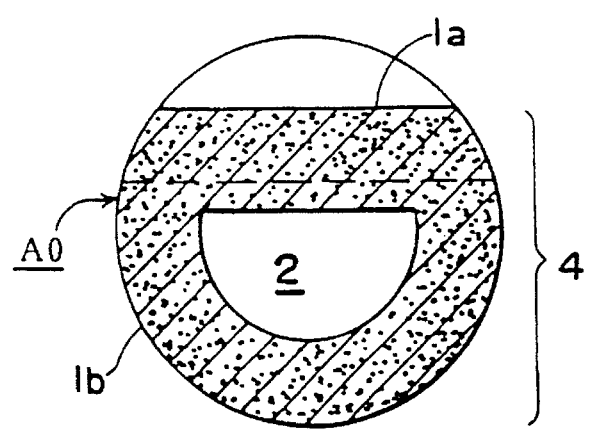
FIG. 10(b) is an enlarged cross-sectional view taken in the direction of arrows along line 10(b) in FIG. 10(a)
Figure 21B:
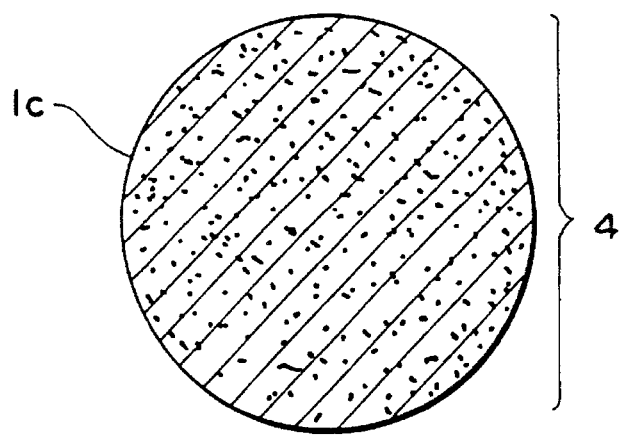
FIG. 21(b) is an enlarged cross-sectional view taken in the direction of arrows along line 21(b) in FIG. 21 (a)

In the thermal refining of the shaft portion 1c as well, there are cases where the hardness of the two halves in a cross section differs [see FIG. 10(b)], and where the hardness is the same as a whole [see FIGS. 21(b) and 22(b)].

It should be noted that, in the case of a power steering apparatus shown in FIG. 2, there are the rack teeth $1_{a1}$ side and the shaft portion $1c$ side, and both are provided with thermal refining.

Figure 13A:
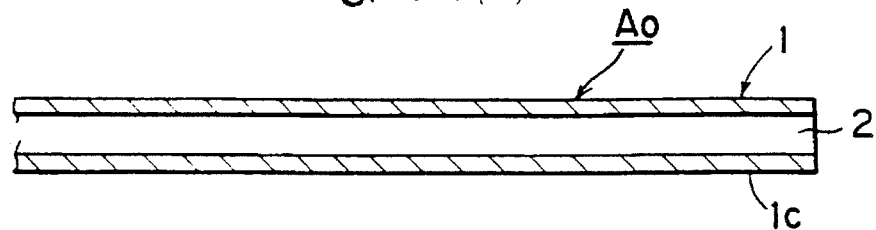
FIGS. 13(a) to 13(e) are schematic diagrams illustrating a process for manufacturing the steering rack shaft in accordance with the present invention.
Figure 13B:
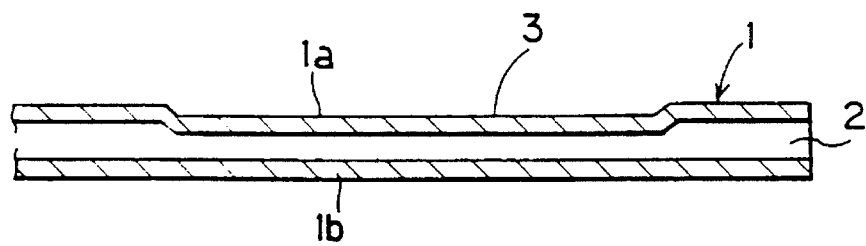
Figure 13C:
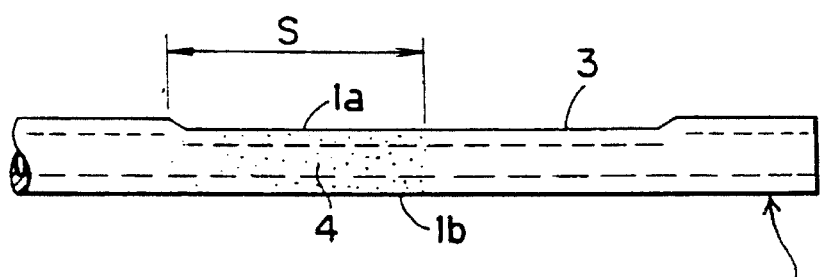
Figure 13D:
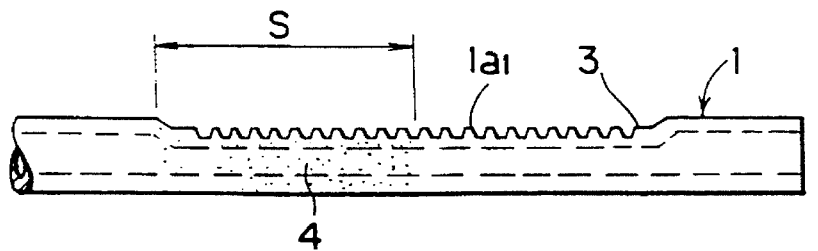
Figure 13E:
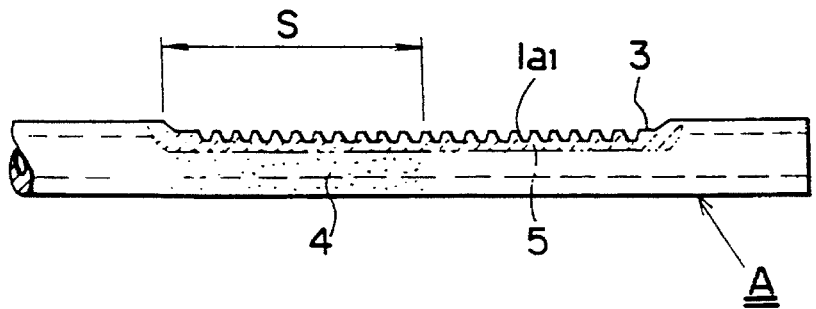

If an overview is taken of the process for manufacturing the above-described steering rack shaft A, the steering rack workpiece $A_0$ [see FIG. 13(a)] is first subjected to press working [see FIG. 13(b)] to form the flat portion 3 at an appropriate portion. Then, the steering workpiece $A_0$ is subjected to quenching by means of the quenching induction coil 19 of the high-frequency induction hardening apparatus. Subsequently, the rack-teeth forming portion $1a$ (a portion to be machined) is tempered at the aforementioned heating temperature by means of the induction coil 20 for high-frequency thermal refining. As a result, the thermally refined portion 4 is formed [see FIG. 13(c)]. Subsequently, the rack teeth $1_{a1}$ are processed [see FIG. 13(d)], and only the rack teeth $1_{a1}$ portion is quenched by the high-frequency induction hardening apparatus [see FIG. 13(e)], thereby manufacturing the steering rack shaft A.

Figure 14A:
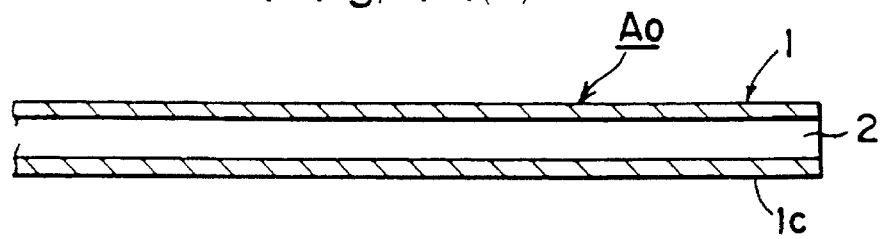
FIGS. 14(a) to 14(e) are schematic diagrams illustrating a process for manufacturing the steering rack shaft in accordance with another embodiment of the present invention.
Figure 14B:
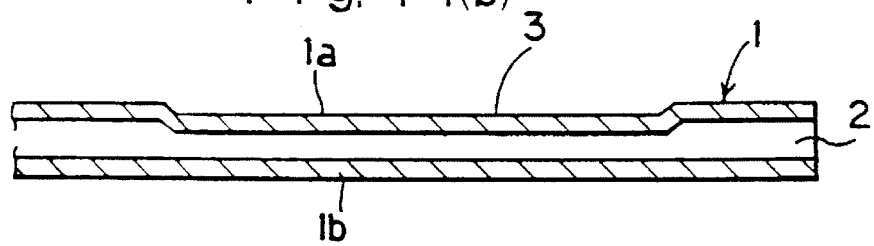
Figure 14C:
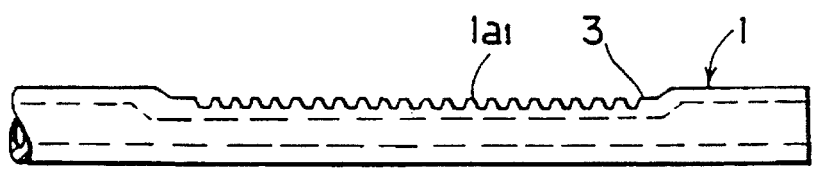
Figure 14D:
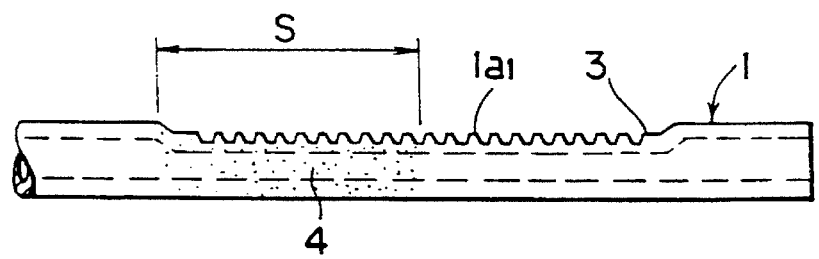
Figure 14E:
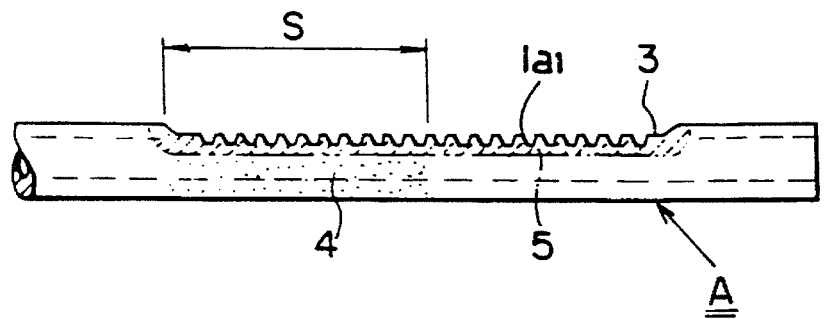

In addition, in another process for manufacturing the steering rack shaft A shown in FIG. 14, after the rack teeth $1_{a1}$ are processed [see FIG. 14(c)], the rack-teeth forming portion $1a$ (the portion to be machined) at the portion having the rack teeth $1_{a1}$ is subjected to tempering at a heating temperature 500° C. to about 700° C. by means of the induction coil 20 for thermal refining, thereby forming a thermally refined portion [see FIG. 14(d)]. Namely, the procedure is opposite to that shown in FIG. 13 in some steps, but the steering rack shaft A is manufactured in the same process as in FIG. 13 in the other steps.

Figure 23:
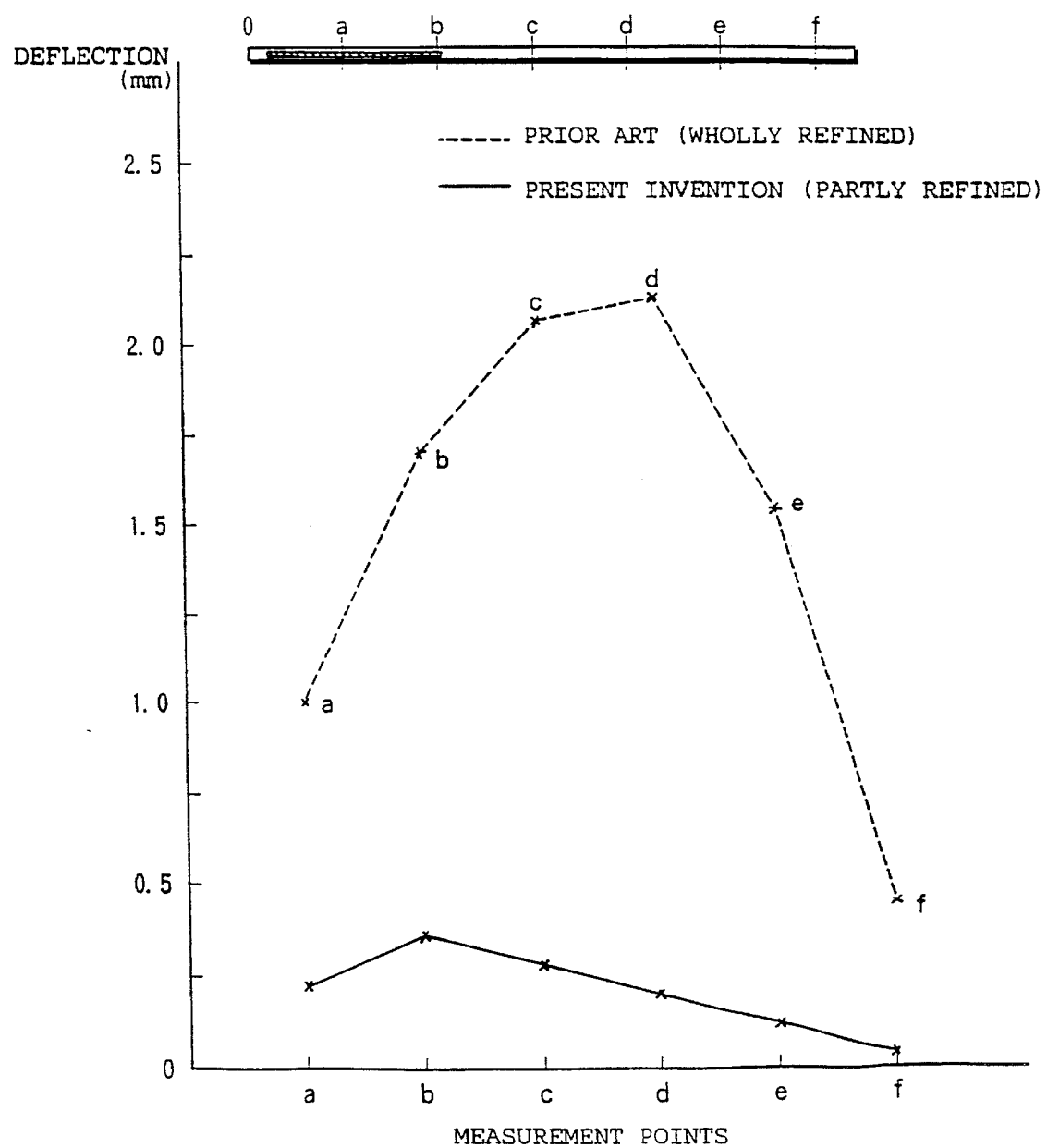
FIG. 23 is a graph of comparison of strain lines due to heat treatment.
Figure 24:
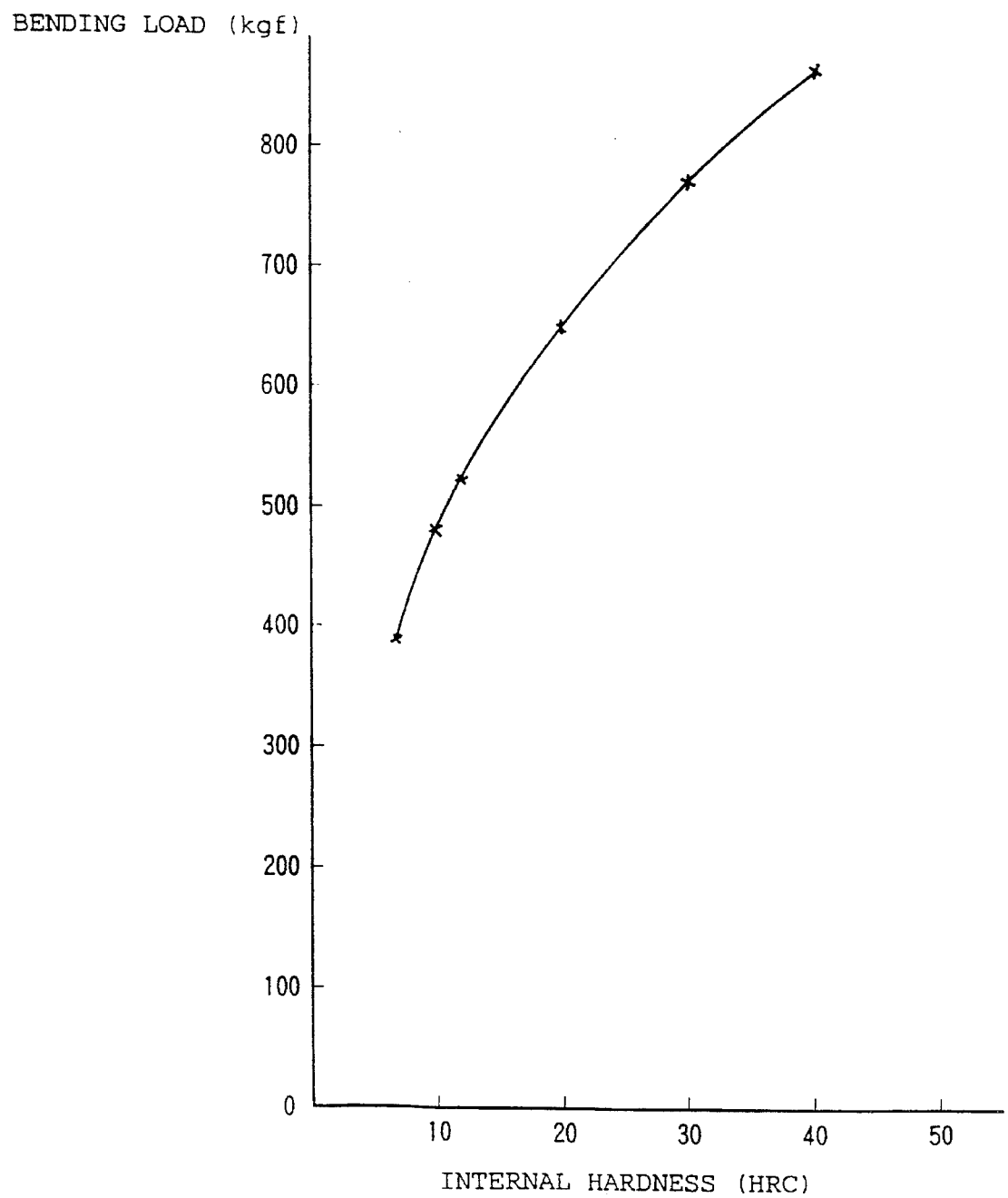
FIG. 24 is a graph of the relationship between the internal hardness of a shaft and a bending load.

As described above, in the present invention, first of all, the strain (deflection) of the steering rack shaft A after thermal refining can be reduced substantially. In consequence, although the hardness in thermal refining is increased (the heating temperature is made close to 400° C.), the strain in the shaft generally becomes large. In the present invention, however, since partial refining is provided, even if the hardness in thermal refining is increased, it is possible to reduce the strain (deflection) in the shaft [see the solid line in the graph of comparison of strain lines of heat treatment in FIG. 23 (as a prior art product, whole refining was provided with a thermally refined hardness of HRC 20; as an example of the present invention, partial refining was provided with a thermally refined hardness of HRC 23 for the teeth side and HRC 35 for the rear-surface side)]. In other words, it is possible to obtain a higher thermally refined hardness than in the thermal refining of the entire rack shaft in accordance with the prior art, and it is possible to strengthen a desired position by a remarkable degree. Furthermore, the formation of the rack teeth $1_{a1}$ after the provision of partial thermal refining, unlike the conventional in-furnace process, makes it possible to handle the products by an integrated production line. Hence, very smooth process control can be effected, and production can be carried out efficiently, thereby improving the manufacturing efficiency and lowering the cost.

In addition, since partial refining is provided, unlike the conventional whole refining, strain relieving is facilitated, and the manufacturing efficiency is improved, leading to the lower manufacturing cost.

Furthermore, in the present invention, since heat treatment is provided such that at least an axial partial portion of the rack-teeth forming portion $1a$ is thermally refined in such a way that the hardness of at least that part of the rack-teeth forming portion $1a$ and the hardness of the rear-surface portion $1b$ diametrically opposite thereto become different, when the rack teeth $1_{a1}$ are formed by machining after the thermal refining, the hardness of that portion of the rack-teeth forming portion $1a$ is relatively low, facilitating the machining. On the other hand, the hardness of the rear-surface portion $1b$ is high, and there is an advantage in that it is possible to obtain rigidity, toughness, and strength capable of sufficiently withstanding a load, such as a bending load or the like during the use.

In addition, in the case where the steering rack shaft A is made hollow by providing the through hole 2, the cross-sectional area is small in the case where the shaft is hollow, and the rigidity is inferior to that of a solid shaft. However, depending on the hardness in thermal refining, the portion of the rack-teeth forming portion $1a$ can be made firm, and the shaft diameter can be minimized.

In particular, even if the steering rack shaft is made hollow, since the thermally refined hardness of the rear-surface portion $1b$ can be made higher than that of the rack-teeth forming portion $1a$, it is possible to provide the hollow steering rack shaft A which is made effectively lightweight without enlarging the shaft diameter.

Since the portion of the rack teeth $1_{a1}$ is provided with the high-frequency induction hardening as a final product, the wear resistance of the teeth is made excellent.

Also, in the case of the steering rack shaft which is provided with heat treatment for thermal refining at a portion other than the rack-teeth forming portion $1a$, since an axial partial portion of the shaft portion $1c$ is thermally refined, even if the hardness in thermal refining is increased, the strain in the shaft can be reduced to a small level. Consequently, it is possible to obtain higher thermally refined hardness than in the whole refining of the conventional rack shaft. Hence, there are advantages in that the desired position can be made firm, that strain relieving can be effected simply, and that the manufacturing cost can be lowered.

What is claimed is:

1. A steering rack shaft comprising:

a shaft body; and a rack-teeth forming portion provided over a fixed axial region of said shaft body;

wherein said rack-teeth forming portion includes a first partial portion provided with rack teeth which are subjected to high frequency induction hardening to form a teeth-hardened layer, a second partial portion applied with partial thermal refining treatment to form a thermally refined structure, and a third partial portion formed as a non-refined portion.

2. A steering rack shaft according to claim 1, wherein a through hole extending in a direction of a central axis of said shaft body is formed in said shaft body.

3. A steering rack shaft according to claim 1, wherein an axial shaft portion of said shaft body other than said rack-teeth forming portion is provided with thermal refining treatment.

4. A steering rack shaft comprising:

a shaft body; and a rack-teeth forming portion provided over a fixed axial region of said shaft body;

wherein at least an axial partial portion of said rack-teeth forming portion is provided with thermal refining treatment;

wherein heat treatment is provided such that the hardness of said portion of said rack-teeth forming portion and the hardness of a rear-surface portion diametrically opposite thereto differ.

5. A steering rack shaft wherein heat treatment is provided such that at least an axial partial portion of a rack-teeth forming portion of a shaft body is quenched and tempered, only said rack-teeth forming portion is thermally refined, the hardness of said thermally refined portion of said rack-teeth forming portion and the hardness of a rear-surface portion diametrically opposite thereto differ.

6. A steering rack shaft according to claim 5, wherein a through hole extending in a direction of a central axis of said shaft body is formed in said shaft body.

7. A steering rack shaft according to claim 5, wherein said rack-teeth forming portion is subjected to high-frequency induction hardening and is provided with rack teeth having a teeth-hardened layer.

8. A steering rack shaft according to claim 5, wherein an axial shaft portion of said shaft body other than said rack-teeth forming portion is provided with thermal refining treatment.

9. A method of manufacturing a steering rack shaft, comprising the steps of:

applying a thermal refining treatment to a first portion of at least an axial partial portion of a rack-teeth forming portion of a shaft body to form a thermal refining structure;

forming rack teeth in a second portion of said rack-teeth forming portion;

high-frequency induction hardening said rack teeth to form a teeth-hardened layer; and forming a remaining portion of said rack-teeth forming portion as a non-refined portion.

10. A method of manufacturing a steering rack shaft according to claim 9, wherein said thermal refining is provided with respect to only said rack-teeth forming portion.

11. A method of manufacturing a steering rack shaft, comprising the steps of:

applying a thermal refining treatment to at least an axial partial portion of a rack-teeth forming portion of a shaft body;

forming rack teeth in said rack-teeth forming portion; and high-frequency induction hardening said rack teeth to form a teeth-hardened layer;

wherein thermal refining is provided such that the hardness of said at least partial portion of said rack-teeth forming portion and the hardness of a rear-surface portion diametrically opposite thereto differ.

* * * * *